June 13, 1933.                 W. S. LYLE                      1,913,555
                                COTTER PIN
                            Filed June 29, 1932
Fig.1.
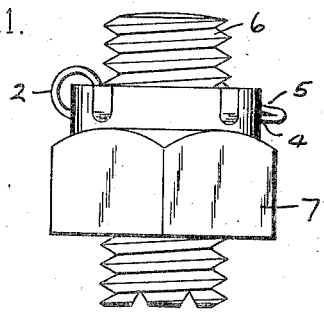
Fig.2.
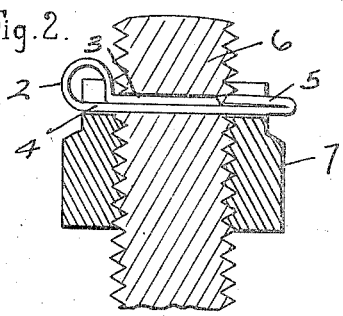
Fig.3.
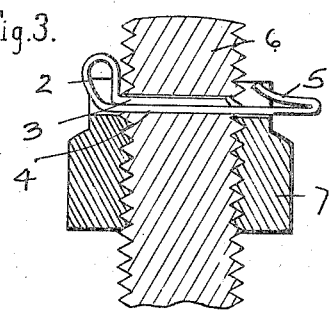
Fig.5.
Fig.4.
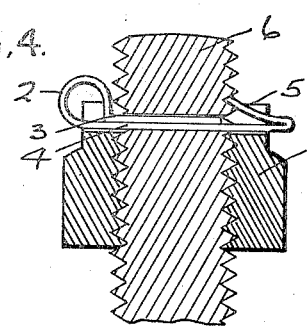
Fig.6.
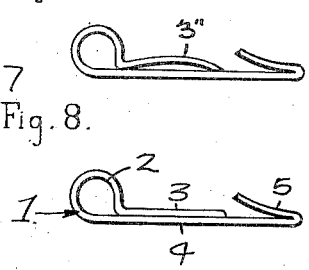
Fig.7.
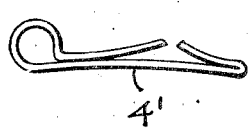
Fig.8.
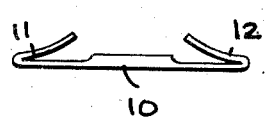
Fig.9.
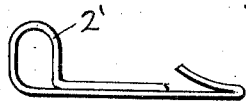
Fig.10.
Fig.11.
INVENTOR.
WILLIAM . S. LYLE.
BY
ATTORNEYS.

Patented June 13, 1933

1,913,555

UNITED STATES PATENT OFFICE

WILLIAM S. LYLE, OF SAN FRANCISCO, CALIFORNIA

COTTER PIN

Application filed June 29, 1932. Serial No. 619,919.

The invention relates particularly to improvements in cotter pins.

An object of the invention is to provide a cotter pin which may be readily inserted into place and which will automatically lock itself in position without requiring a person installing the cotter pin to deform said pin into a locking position.

A further object of the invention is to provide a locking pin of the character to be described hereinafter, wherein, for example, the said pin is placed through aligned holes in a nut and bolt, and two thicknesses of metal of the pin will prevent relative rotation between the nut and bolt, one of the thicknesses of the metal extending beyond the nut and is returned upon itself to provide a locking member to prevent the said pin from working out of place.

In this specification and the annexed drawing, the invention is illustrated in the form considered to be the best, but it is to be understood that the invention is not limited to such form, because it may be embodied in other forms; and it is also to be understood that in and by the claim following the description, it is desired to cover the invention in whatsoever form it may be embodied.

In the accompanying one sheet of drawing:

Fig. 1 is a side elevation of a section of a bolt and nut, showing the cotter pin constructed in accordance with my invention arranged therein.

Fig. 2 is a vertical cross section taken through Fig. 1, showing the pin inserted through the bolt immediately previous to being placed in the locking position.

Fig. 3 is a view similar to Fig. 2 showing the cotter pin forced completely through the bolt, by temporarily deforming the loop end of the pin to permit the locking portion of the pin to flare upwardly to engage the threads on the bolt.

Fig. 4 is a view similar to Figs. 2 and 3 showing the pin in the locking position.

Fig. 5 is a modified form of cotter pin in which the opposite adjacent ends of the pin are provided with a slight flare in the same direction.

Fig. 6 is a still further modified form of pin showing the opposite ends of the pin flared in opposite directions.

Fig. 7 is a still further modified form of pin showing the opposite ends of the pin flared in the same direction and having the longer leg of the pin also provided with a curve.

Fig. 8 is a side elevation of the form of the pin depicted in Figs. 1, 2, 3 and 4.

Fig. 9 is a still further modified form of pin having the looped end of the pin provided with flattened sides and having the two legs of the pin lying in parallelism, with an end of said pin bent back upon itself and flared outwardly.

Fig. 10 is a still further modified form of pin having the opposite ends bent back upon the pin and flared outwardly to permit the pin to be inserted or withdrawn from either side of the bolt.

Fig. 11 is a still further modified form of cotter pin having an end of the pin bent upon itself and being provided with an attenuated shape.

In detail the construction illustrated in the drawing consists of a cotter pin preferably formed of half-round wire, although wire of other cross section may be used without departing from the spirit of the invention.

The pin consists of a length of wire 1, bent intermediate the ends thereof to form an eyelet or loop 2, which eyelet or loop 2 is arranged completely on one side of the legs of the pin, in contradistinction to the loop of the conventional cotter pin which projects equally on opposite sides of the cotter pin legs. The purpose of forming the loop entirely on one side of the cotter pin legs, permits the said loop or eyelet to be compressed or deformed whenever the cotter pin is to be engaged with a bolt and nut.

The wire 1 is bent between its ends to form a pair of legs 3 and 4, the leg 3 being shorter than the leg 4. The end 5 of the longer leg 4 is bent back upon the leg 4 for a portion of the length thereof so that the bent end 5 will approximately contact the end of the shorter leg 3. The bent end 5 of the pin is curved or flared away from the leg 4, from which it is formed, so as to project beyond the plane of the legs 3 and 4 which lie in parallelism.

The form of pin shown in Figs. 9 and 11 are substantially the same as the pins shown in Fig. 8, as well as the pins shown in Figs. 1 through 4 inclusive, with the difference that the loop or eyelet 2' shown in Fig. 9, has the opposite sides thereof flattened, and with the further difference that the flared end 5' shown in Fig. 11 is attenuated and graduated in cross section.

The pin is preferably formed out of metal which is inherently springy. In Fig. 2 I have illustrated a section of a bolt 6, having a nut 7 thereon, the bolt being drilled and the nut being castellated so that a cotter pin may be passed therethru to hold the nut in a selected position on the bolt. In Fig. 2 the cotter pin is shown almost completely through the bolt, the flared end 5 of the pin still being confined within the hole through the bolt. The distance between the flared end 5 of the pin and the loop on the pin is slightly less than the diameter of the bolt, making it necessary to temporarily deform or reduce the diameter and area of the loop 2, as shown in Fig. 3, in order to completely disengage the flared end 5 of the pin from the hole in the bolt and to allow said flared end 5 to spring outwardly. When the flared end 5 of the pin has been cleared from the bolt hole, the installing pressure is removed from the looped end of the pin so that the said loop may assume its normal shape, thereby tending to move the pin slightly outward in the bolt so that the flared end will engage the grooves of the bolt threads. When the pin has been forced completely through the bolt hole, the bent end 5 on the longer leg of the pin, automatically springs away from said longer leg of the pin and abuts against the outside of the bolt, thus preventing the pin from working loose.

The short and long legs of the cotter pin, when installed in the nut and bolt, provides two thicknesses of metal through the nut and bolt, to effectively prevent any turning torque on the nut or bolt from shearing the cotter pin. The looped portion of the pin and the flared end of the pin engage opposite sides of the bolt to prevent movement of the cotter pin in either direction. The cotter pin may be removed from the bolt by forcing the bent end of the pin down into registry with the hole through the bolt, eliminating the necessity of cutting off an end of the pin in order to remove it.

In Fig. 5 I have shown a cotter pin with a short leg 3' having an outward flare or curve, which flare or curve extends in the same direction as the flare or curve of the bent end of the pin.

In Fig. 6 I have shown the short leg of the pin 3'' flared or curved in a direction opposite to the flare or curve of the bent end of the pin.

In Fig. 7 I have shown the longer leg 4' provided with a curve or flare in contradistinction to the straight form of leg shown in the other figures.

The curved or flared short and long legs shown in Figs. 5, 6 and 7 serves to provide additional friction creating means on the pin when installed in position to prevent the said pin from moving or working loose from the said position.

In Fig. 10 I have shown a cotter pin consisting of a length of wire 10, having each of the opposite ends 11 and 12 bent back thereupon, and each of said bent ends being provided with a flare or curvature which will cause said bent ends to spring upwardly and engage opposite sides of a bolt and thereby prevent movement of the pin in either direction.

In conclusion I have found that cotter pins formed such as I have described them, with the looped end of the cotter pin provided entirely on one side of the legs of the pin, permits said looped end to be slightly compressed without disturbing the normal curvature or shape thereof at such times as the cotter pin is being positioned on a bolt or removed therefrom. The close relationship which exists between the diameter of the bolt and the distance between the looped end of the pin and the flared end of the pin, is effectively compensated for by the spring loop 2 which will adjust itself to any slight differences in diameter of the bolt to which the cotter pin might be applied, without completely preventing the functioning of the invention.

Having thus described this invention, what I claim and desire to secure by Letters Patent is:

A cotter pin formed of a single piece of stock having a flat face, said cotter pin consisting of a leg, a resilient loop extending laterally from said leg at one side only and beyond the end thereof, and a second leg having its flat side in substantial engagement with the flat face of the first leg, and having one end thereof connected to the outer portion of the loop, and the other end thereof extending beyond said first leg and bent on itself and terminating in an outward flare facing the end portion of the other leg, whereby when said pin is inserted in a member having a hole the loop contacts with the outside of said member and is compressible toward the member to advance the longer leg axially thru the member to free the flared end and to allow it to contact with the outer side of said member opposite to the side engaged by the loop for locking the pin in position in the member.

In testimony whereof, I have hereunto set my hand at San Francisco, California, this 22d day of June 1932.

WILLIAM S. LYLE.